(12) United States Patent
Kushida

(10) Patent No.: US 7,671,137 B2
(45) Date of Patent: Mar. 2, 2010

(54) RUBBER COMPOSITION FOR TIRE

(75) Inventor: Naoki Kushida, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 12/245,014

(22) Filed: Oct. 3, 2008

(65) Prior Publication Data

US 2009/0093594 A1  Apr. 9, 2009

(30) Foreign Application Priority Data

Oct. 5, 2007 (JP) ............................. 2007-262467
Jul. 29, 2008 (JP) ............................. 2008-195415

(51) Int. Cl.
*C08C 19/22* (2006.01)
*C08C 19/20* (2006.01)

(52) U.S. Cl. .................... 525/351; 525/353; 152/209.7; 156/130.5

(58) Field of Classification Search ................. 525/351, 525/353; 152/209.7; 156/130.5
See application file for complete search history.

(56) References Cited

U.S. PATENT DOCUMENTS 4,843,128 A  6/1989  Cesare 6,376,623 B1 * 4/2002 Hoenig et al. ............... 525/344
2009/0071584 A1 * 3/2009 Zhang et al. ............. 152/209.5

FOREIGN PATENT DOCUMENTS

| JP | 03-106946 A | * | 5/1991 |
| JP | 6011815 | | 1/1994 |
| JP | 7005798 | | 1/1995 |
| JP | 08-134248 | * | 5/1996 |
| JP | 8134248 | | 5/1996 |
| JP | 2001-514289 | | 9/2001 |
| WO | WO-99/10423 | | 3/1999 |

* cited by examiner

*Primary Examiner*—Ling-Siu Choi
(74) *Attorney, Agent, or Firm*—Connolly Bove Lodge & Hutz LLP

(57) ABSTRACT

To provide a rubber composition for a tire increasing the interaction between rubber fillers, low in heat buildup, and able to raise the vulcanization speed.

A rubber composition for a tire containing 100 parts by weight of (A) a sulfur-vulcanizable diene-based rubber, (B) 0.1 to 1 part by weight of a 4,4'-oxybis(benzenesulfonylazide) and (C) a vulcanization type compounding agent, wherein the ingredients (A) and (B) are mixed at the time of a first mixing step before the compounding of the ingredient (C).

4 Claims, No Drawings

RUBBER COMPOSITION FOR TIRE

TECHNICAL FIELD

The present invention relates to a rubber composition for a tire, more particularly relates to a rubber composition for a tire capable of increasing the interaction between the rubber and fillers, whereby a low heat buildup property and an increased vulcanization speed are obtained.

BACKGROUND ART

In recent years, the performance sought from tires has become of a higher order due to various techniques. As one example, the decrease in the rolling resistance of the tire is being strongly sought due to the needs of the market for greater fuel efficiency. As the technique for reducing the rolling resistance, there is the art of modifying the ends of rubber molecules with various functional groups to improve the dispersability of a filler in the rubber to thereby improve the fuel efficiency. However, modifying the ends of rubber molecules and obtaining the maximum effect of the same requires modification of many end groups. As a result, the molecular weight of the rubber is decreased. When low molecular weight end-modified rubber is used, in particular when silica is used, as a filler, a long period of mixing is required for sufficient reaction and filler dispersion, but, in this case, there is the problem that the rubber molecules are increasingly cut to thereby cause the decrease in the viscosity.

To solve these problems, if it is possible to modify the main chains of rubber during mixing, it would be possible to increase the interaction between rubber and fillers, without causing the decrease in the molecular weight and would be possible to obtain a rubber composition capable of satisfying the desired tire performance. Accordingly, in the present invention, a specific compounding agent (i.e., 4,4'-oxybis(benzenesulfonylazide)) is used as the main chain modifying agent to thereby successfully obtain a rubber composition for a tire capable of increasing the interaction between rubber and fillers. Thus, the rubber composition for a tire having excellent fuel efficiency can be obtained.

In the past, it has been proposed to use the 4,4'-oxybis(benzenesulfonylazide), as a curing agent, to obtain an elastomer composition having an excellent ozone resistance, etc. (see, for example, Japanese Patent Publication No. 6-11815B and Japanese Patent Publication No. 7-5798B), to use this, as a foam agent/cross-linking agent, to obtain a sponge-like rubber composition for a molding die, which does not generate clouding or polluting the contacted members (see, for example, Japanese Patent Publication No. 8-134248A), etc. However, there has been no known document which, like the present invention, uses this as a main chain modifying agent of rubber so as to obtain a rubber composition for a tire having an excellent fuel efficiency.

DISCLOSURE OF THE INVENTION

An object of the present invention is to provide a rubber composition for a tire capable of increasing the interaction between rubber and fillers, whereby the low heat buildup property is obtained and the vulcanization speed is increased by reacting the specific main chain modifying agent with the main chains of rubber during the mixing.

In accordance with the present invention, there is provided a rubber composition for a tire comprising (A) 100 parts by weight of a sulfur-vulcanizable diene-based rubber, 0.1 to 1 part by weight of (B) a 4,4'-oxybis(benzenesulfonylazide) and (C) a vulcanization type compounding agent, wherein the ingredients (A) and (B) are mixed at the time of a first mixing step before the compounding of the ingredient (C).

BEST MODE FOR CARRYING OUT THE INVENTION

In this specification and in the claims which follow, the singular forms "a", "an" and "the" include plural referents unless the context clearly dictates otherwise.

The inventors found that, when 4,4'-oxybis(benzenesulfonylazide) (OBSA) (B) is compounded into the diene-based rubber (A), as a main chain modifying agent, at the time of the first mixing stage before the addition of the vulcanization system compounding agents (C), followed by heating and mixing the resultant mixture at a temperature of 160 to 170° C., the OBSA reacts with the main chain of the diene-based rubber (A) to constrain the movement of the rubber molecules, and, therefore, it is possible to lower the heat buildup property and increase the vulcanization speed, without detracting from the strength at break.

As the diene-based rubber (A) usable in the rubber composition for a tire of the present invention, for example, natural rubber (NR), isoprene rubber (IR), various types of butadiene rubber (BR), various types of styrene-butadiene copolymer rubber (SBR), acrylonitrile-butadiene compolymer rubber (NBR), styrene-isoprene copolymer rubber, styrene-isoprene-butadiene copolymer rubber, isoprene-butadiene copolymer rubber, etc. may be used alone or as any blend rubber of two or more types of rubbers.

The 4,4'-oxybis(benzenesulfonylazide) (OBSA) compounded, as a main chain modifying agent, into the rubber composition for a tire according to the present invention is an azide compound shown by the following formula (I). Due to the heat at the time of mixing and heating the OBSA and the diene-based rubber, nitrogen gas ($N_2$) is generated from the azide groups of the two ends by the reaction mechanism shown below. The nitrogen radicals of the residue and the main chain of the diene-based rubber react and the cross-linked part of the diene-based rubber to thereby exhibit the effect of the present invention. Note that OBSA is a known compound. A commercially available product may be used.

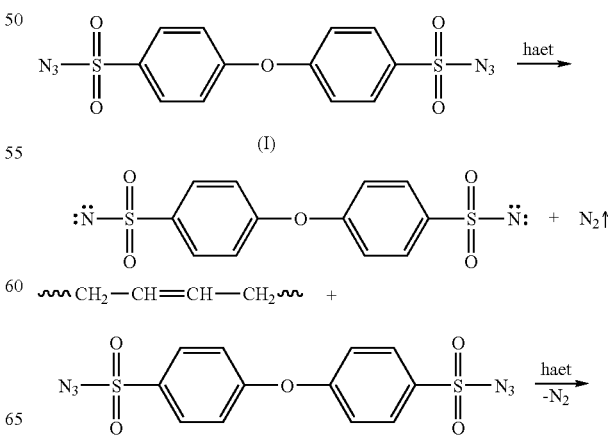

-continued

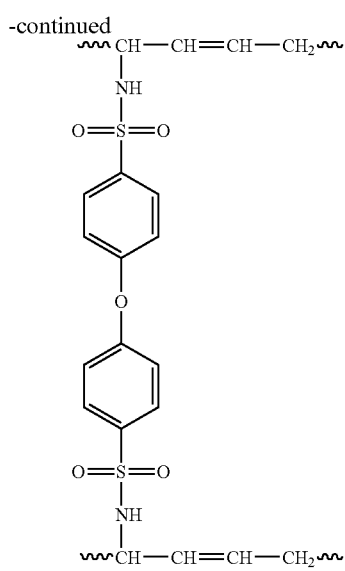

The 4,4'-oxybis(benzenesulfonylazide) (OBSA) main chain modifying agent of the compounding agent of the present invention is used in an amount, based upon 100 parts by weight of the diene-based rubber, of 0.1 to 1 part by weight, preferably 0.2 to 0.6 parts by weight. If this amount is too small, the desired effect cannot be obtained, while conversely if too large, the scorching becomes too fast and the workability is deteriorated (i.e., rubber becomes powdery), and, therefore, this is not preferred.

In the present invention, the main chain modifying agent is required for the reaction by the above reaction mechanism to sufficiently proceed, and, therefore, it is important that this be premixed and kneaded into the diene-based rubber including the filler before addition of the vulcanization compounding agents using, for example a Banbury mixer, etc. under heating conditions of 160 to 170° C. During the mixing, the nitrogen gas generated from the main chain modifying agent is exhausted from the system, and, therefore, does not remain in the rubber and the rubber after the mixing does not form the foamed rubber. Further, if the main chain modifying agent is compounded at the final mixing stage where the vulcanization compounding agents are added, the generated nitrogen gas would remain in the rubber system to thereby result in the foamed rubber, which is not suitable for the intended tire applications.

The rubber composition for a tire of the present invention may contain, as a filler, a general carbon black or silica or both in the usual predetermined range of amount. The timing of compounding the filler is not particularly limited, but adding it at the time of the first mixing stage is preferable from the viewpoint of the dispersibility of the filler.

As the vulcanization compounding agents usable as the ingredient (C) in the present invention, for example, a vulcanization or cross-linking agent, vulcanization or cross-linking accelerator, vulcanization or cross-linking accelerating aids, etc. may be mentioned. For these, any materials generally used in rubber compositions for tire in the past may be used.

The rubber composition for tire according to the present invention may further includes an antioxidant, a silane coupling agent, or other various compounding agents usually compounded in rubber compositions for tire. These compounding agents may be mixed at any timing by a general method to obtain a rubber composition for vulcanization or cross-linking. The amounts of these compounding agents may be made the conventional general amounts so long as the object of the present invention is not adversely affected.

EXAMPLES

Examples and Comparative Examples will now be used to further explain the present invention, but the scope of the present invention is by no means limited to these Examples.

Examples 1 to 12 and Comparative Examples 1 to 8

Preparation of Samples

In accordance with each formulation shown in Table I and Table II (parts by weight), the rubber, OBSA, carbon black, and other compounding agents other than the sulfur and vulcanization accelerator were charged into a 1.7 liter Type B Banbury mixer and mixed for 5 to 6 minutes. When reaching 165° C., the resultant mixture was discharged to obtain a master batch. To this masterbatch, the sulfur and vulcanization accelerator were compounded and the resultant mixture was mixed by an open roll to obtain a rubber composition. A part of this composition was used for the following vulcanization speed test. Next, the remaining rubber composition was press vulcanized in a predetermined mold at a temperature of 160° C. for 20 minutes to prepare a test sample (i.e., rubber sheet), which was then used for the following tests for determining rolling resistance and tensile strength.

The results are shown in Table I and Table II.

Test Methods

1) Vulcanization speed: Determined according to JIS K6300. Time (minutes) until reaching 30% vulcanization was determined using a vibration type disk vulcanization tester under the conditions of an amplitude of 1 degree and a temperature of 160° C.

2) Rolling resistance: Rolling resistance evaluated by a value of tan δ (at 60° C.) determined according to JIS K6394 using a viscoelasticity at spectrometer made by Toyo Seiki Seisakusho under conditions of an initial strain of 10%, an amplitude of ±2%, and a frequency of 20 Hz. The results are shown, as indexed to the values of Comparative Examples 1, 2, 5, and 7 as 100. The smaller this index, the better the rolling resistance shown.

3) Strength at break: Tensile elongation at break ($T_B$) measured was determined according to JIS K6251 using a JIS No. 3 dumbbell shaped sample. The results are shown, as indexed to the values of Comparative Examples 1, 2, 5, and 7 as 100. The larger this value, the larger the breakage strength.

4) Scorch: Determined according to JIS K6251. The results are shown, as indexed to the values of Comparative Examples 1, 2, 5, and 7 as 100. The smaller this index, the higher the strength at break.

TABLE I

|  | Comp. Ex. 1 | Ex. 1 | Ex. 2 | Ex. 3 | Comp. Ex. 2 | Comp. Ex. 3 | Ex. 4 | Ex. 5 | Ex. 6 | Comp. Ex. 4 |
|---|---|---|---|---|---|---|---|---|---|---|
| Formulation (parts by weight) | | | | | | | | | | |
| SBR[1] | 100 | 100 | 100 | 100 | 60 | 60 | 60 | 60 | 60 | 60 |
| BR[2] | — | — | — | — | 40 | 40 | 40 | 40 | 40 | 40 |
| Carbon black[3] | 50 | 50 | 50 | 50 | 50 | 50 | 50 | 50 | 50 | 50 |
| Zinc oxide[4] | 2 | 2 | 2 | 2 | 2 | 2 | 2 | 2 | 2 | 2 |
| Stearic acid[5] | 1 | 1 | 1 | 1 | 1 | 1 | 1 | 1 | 1 | 1 |
| Antiaging agent[6] | 2 | 2 | 2 | 2 | 2 | 2 | 2 | 2 | 2 | 2 |
| Aromatic oil[7] | 10 | 10 | 10 | 10 | 10 | 10 | 10 | 10 | 10 | 10 |
| OBSA[8] | — | 0.2 | 0.4 | 0.6 | — | — | 0.2 | 0.4 | 0.6 | 1.2 |
| Sulfur[9] | 2 | 2 | 2 | 2 | 2 | 2 | 2 | 2 | 2 | 2 |
| Vulcanization accelerator CBS[10] | 2 | 2 | 2 | 2 | 2 | 2 | 2 | 2 | 2 | 2 |
| Properties | | | | | | | | | | |
| Rolling resistance (index) | 100 | 94 | 90 | 87 | 100 | 100 | 93 | 90 | 88 | 87 |
| Strength at break (index) | 100 | 100 | 101 | 101 | 100 | 100 | 100 | 100 | 100 | 102 |
| Vulcanization speed (min) | 5.4 | 5.0 | 4.5 | 4.2 | 5.2 | 5.2 | 4.9 | 4.3 | 4.0 | 3.2 |
| Scorch (index) | 100 | 100 | 98 | 97 | 90 | 100 | 100 | 99 | 98 | 91 |

(Notes)
[1] Nipol 1502 (made by Nippon Zeon)
[2] Nipol 1220 (made by Nippon Zeon)
[3] Shoblack N234 (made by Cabot Japan)
[4] Zinc Oxide No. 3 (made by Seido Chemical Industry)
[5] Beads Stearic Acid (made by NOF Corporation)
[6] Santoflex 6PPD (made by Flexsys)
[7] Extract No. 4S (made by Showa Shell Oil)
[8] 4,4'-oxybis(benzenesulfonylazide) (made by Eiwa Chemical Industry)
[9] Gold Flower brand oil-treated sulfur powder (made by Tsurumi Chemical Industry)
[10] Noccelar CZ-G (made by Ouchi Shinko Chemical Industrial)

TABLE II

|  | Comp. Ex. 5 | Ex. 7 | Ex. 8 | Ex. 9 | Comp. Ex. 6 | Comp. Ex. 7 | Ex. 10 | Ex. 11 | Ex. 12 | Comp. Ex. 8 |
|---|---|---|---|---|---|---|---|---|---|---|
| Formulation (parts by weight) | | | | | | | | | | |
| SBR[1] | 100 | 100 | 100 | 100 | 100 | 60 | 60 | 60 | 60 | 60 |
| BR[2] | — | — | — | — | — | 40 | 40 | 40 | 40 | 40 |
| Carbon black[3] | 5 | 5 | 5 | 5 | 5 | 5 | 5 | 5 | 5 | 5 |
| Silica[4] | 45 | 45 | 45 | 45 | 45 | 45 | 45 | 45 | 45 | 45 |
| Silane coupling agent[5] | 4 | 4 | 4 | 4 | 4 | 4 | 4 | 4 | 4 | 4 |
| Zinc oxide[6] | 2 | 2 | 2 | 2 | 2 | 2 | 2 | 2 | 2 | 2 |
| Stearic acid[7] | 1 | 1 | 1 | 1 | 1 | 1 | 1 | 1 | 1 | 1 |
| Antiaging agent[8] | 2 | 2 | 2 | 2 | 2 | 2 | 2 | 2 | 2 | 2 |
| Aromatic oil[9] | 10 | 10 | 10 | 10 | 10 | 10 | 10 | 10 | 10 | 10 |
| OBSA[10] | — | 0.2 | 0.4 | 0.6 | 1.2 | — | 0.2 | 0.4 | 0.6 | 1.2 |
| Sulfur[11] | 2 | 2 | 2 | 2 | 2 | 2 | 2 | 2 | 2 | 2 |
| Vulcanization accelerator CBS[12] | 2 | 2 | 2 | 2 | 2 | 2 | 2 | 2 | 2 | 2 |
| Vulcanization accelerator DPG[13] | 1 | 1 | 1 | 1 | 1 | 1 | 1 | 1 | 1 | 1 |
| Properties | | | | | | | | | | |
| Rolling resistance (index) | 100 | 94 | 91 | 88 | 87 | 100 | 93 | 90 | 88 | 87 |
| Strength at break (index) | 100 | 100 | 100 | 100 | 101 | 100 | 100 | 100 | 100 | 101 |
| Vulcanization speed (min) | 6.0 | 5.8 | 5.5 | 5.2 | 4.6 | 5.8 | 5.6 | 5.3 | 5.0 | 4.2 |
| Scorch (index) | 100 | 99 | 99 | 97 | 89 | 100 | 100 | 99 | 97 | 90 |

(Notes)
[1] Nipol 1502 (made by Nippon Zeon)
[2] Nipol 1220 (made by Nippon Zeon)
[3] Shoblack N234 (made by Cabot Japan)
[4] Zeosil 165GR (made by Rhodia)
[5] Si69 (made by Degussa)
[6] Zinc Oxide No. 3 (made by Seido Chemical Industry)
[7] Beads Stearic Acid (made by NOF Corporation)
[8] Santoflex 6PPD (made by Flexsys)
[9] Extract No. 4S (made by Showa Shell Oil)
[10] 4,4'-oxybis(benzenesulfonylazide) (made by Eiwa Chemical Industry)
[11] Gold Flower brand oil-treated sulfur powder (made by Tsurumi Chemical Industry)
[12] Noccelar CZ-G (made by Ouchi Shinko Chemical Industrial)
[13] Soxinol D-G (made by Sumitomo Chemical)

According to the results shown in Table I and Table II, it is clear that, in the rubber composition according to the present invention, the rolling resistance is improved and the vulcanization speed is increased without detracting from the strength at break.

INDUSTRIAL APPLICABILITY

As explained above, the rubber composition of the present invention having the OBSA compounded at the time of the first mixing stage is improved in the rolling resistance, without impairing the strength at break, and, therefore, this is extremely effective when utilized for a pneumatic tire, in particular for the tread use thereof.

The invention claimed is:

1. A rubber composition for a tire comprising:
   (A) 100 parts by weight of a sulfur-vulcanizable diene-based rubber,
   (B) 0.2 to 0.6 part by weight of 4,4'-oxybis(benzenesulfonylazide),
   (C) a vulcanization compounding agent and
   (D) carbon black and/or silica as a filler
   wherein the ingredients (A), (B) and (D) are mixed at the time of a first mixing stage before the compounding of the ingredient (C).

2. A rubber composition as claimed in claim 1, wherein the diene based rubber is selected from the group consisting of natural rubber, butadiene rubbers and styrene-butadiene compolymer rubbers.

3. A pneumatic tire using a rubber composition according to claim 1.

4. A pneumatic tire using a rubber composition according to claim 2.

* * * * *